Dec. 5, 1961 T. OPERHALL ET AL 3,011,986
DIP COAT COMPOSITION FOR METAL CASTING COMPRISING CERAMIC
FLOUR, COLLOIDAL SILICA, GUM, ALKALI METAL
FLUORIDE AND RUBBER LATEX
Filed Sept. 12, 1958

INVENTORS
THEODORE OPERHALL
CHARLES W. SCHWARTZ
BY Ooms, McDougall,
Williams & Hersh
ATTORNEYS United States Patent Office 3,011,986
Patented Dec. 5, 1961

3,011,986
DIP COAT COMPOSITION FOR METAL CASTING COMPRISING CERAMIC FLOUR, COLLOIDAL SILICA, GUM, ALKALI METAL FLUORIDE AND RUBBER LATEX
Theodore Operhall and Charles W. Schwartz, Whitehall, Mich., assignors, by mesne assignments, to Howe Sound Company, New York, N.Y., a corporation of Delaware
Filed Sept. 12, 1958, Ser. No. 760,669
14 Claims. (Cl. 260—17.4)

This invention relates to the art of metal casting, and it relates more particularly to a composition and method used in the preparation of a monolithic shell into which molten metal may be poured directly without the necessity to support the shell by investment.

This application is addressed to a composition which can be employed beneficially as an improved dip coat composition in the system described and claimed in the copending application of Operhall et al., and entitled "Metal Casting Process and Elements and Compositions Used in Same," Serial No. 708,628, filed January 13, 1958, now Patent 2,961,751.

In the aforementioned copending application, description is made of the preparation and use of a monolithic shell wherein the shell that is formed is characterized by a strength sufficient to enable use of the mold by clamping the mold directly to the furnace outlet for pouring, thereby to avoid the time and expense heretofore required for investment. It is characterized further by construction wherein an inorganic eutectic, flexing material, having a temperature of incipient fusion lower than the remainder, is applied onto the surfaces of the mold after it is formed, whereby such eutectic material in the outer portion of the shell mold is capable of flow to fill or seal cracks or crevices formed in the shell mold prior to or during firing or metal pouring.

In accordance with the practice described in the aforementioned copending application, a shell of ceramic material is built up on the surfaces of a cluster of wax patterns by dipping the cluster in a binder composition containing a ceramic filler to provide a uniform coating on the surfaces and applying a stucco of ceramic material onto the wet surfaces of the pattern to provide strength and integrity to the layer. A series of such layers of dip coats and stucco coats are provided one on the other to build up a thickness in a shell sufficient to impart strength for metal pouring without investment.

The strength characteristics of the shell have been found greatly to be enhanced by the formulation of the dip coats forming the outer portions of the shell to contain a ceramic having an incipient fusion range which is below that of the other ceramic fillers and stucco used in building up the dip coat and stucco coats, such as the zircon flour in the dip coat composition and the Alundum particles in the stucco coats.

The dip coat compositions which have been employed to the present have been found to be somewhat deficient in many respects when employed in the system described in the aforementioned application.

It is an object of this invention, therefore, to provide an improved composition for use as the dip coat and the eutectic coat in building up the monolithic shell on the patterns of wax or other disposable material, and it is a related object to provide a composition of the type described which has particular application to the process described in the aforementioned copending application but which may also be employed as an improved dip coat composition for coventional investment casting processes.

These and other objects and advantages of this invention will hereinafter appear and for purposes of illustration, but not of limitation, an element of the invention is shown in the accompanying drawing, in which—

The following is representative of a dip coat composition embodying the features of this invention for use as a base for the stucco coats:

*Dip coating composition*

4900 cc. colloidal silica (less than 29.5% Si $O_2$) (specific gravity 1.198, ph 10 ±.05)
105 pounds zircon (99% through 325 mesh) (65–67% $ZrO_2$, 32–34% $SiO_2$)
3780 cc. sodium fluoride solution (90 grams sodium fluoride per 3690 cc. of water)
187 cc. of gum tragacanth–sodium benzoate solution (89 parts by weight of gum tragacanth, 0.25 parts by weight sodium benzoate, 4000 parts by weight of water)
280 cc. of rubber latex (60% solids; Dow Latex 560)
400 cc. of wetting agent (1000 grams of Wetanol—Glyco Products Company, per 18.9 litres of water)
28 cc. octyl alcohol The following is representative of a dip coat composition containing a ceramic flour or filler material having a lower incipient fusion than the zircon flour in the above composition for use of the following composition in forming the outer coats of the shell built up on the pattern of wax or other disposable material:

*Eutectic coat composition*

4900 cc. of colloidal silica (less than 29.5% $SiO_2$) (specific gravity 1.198, pH 10 ±.05)
85 pounds of zircon flour (99% through 325 mesh) (65–67% $ZrO_2$, 32–34% $SiO_2$)
9.5 pounds of feldspar (less than 8% KNaO, less than 6% CaO, 16–19% $Al_2O_3$, 60–63% $SiO_2$)
3780 cc. of sodium fluoride solution (90 grams sodium fluoride per 3690 cc. of water)
187 cc. gum tragacanth—sodium benzoate solution (89 parts by weight of gum tragacanth, 0.25 part by weight sodium benzoate, 4000 parts by weight of water)
190 cc. of rubber latex (60% solids; Dow Latex 560)
300 cc. of wetting agent (1000 grams of Wetanol—Glyco Products Company, per 18.9 litres of water)
28 cc. of octyl alcohol The ingredients in the amounts set forth in the examples are sufficient to make up 25 quarts of a dip coat composition by the addition of suitable amounts of water.

In a mixing tank of suitable capacity, the colloidal silica, the sodium fluoride solution, gum tragacanth-benzoate solution, and the rubber latex are added. After the materials have been uniformly and completely dispersed, the zircon flour in Example 1 or the zircon and feldspar flours in Example 2 is slowly pored into the mixer with continued agitation at relatively high speed to promote a uniform distribution of the flour and to produce a uniform slip. Following the incorporation of the flour, the surface-active or wetting agent and the octyl alcohol are added while mixing is continued for a short period of time, as for example, about 15 minutes.

Figure 1:
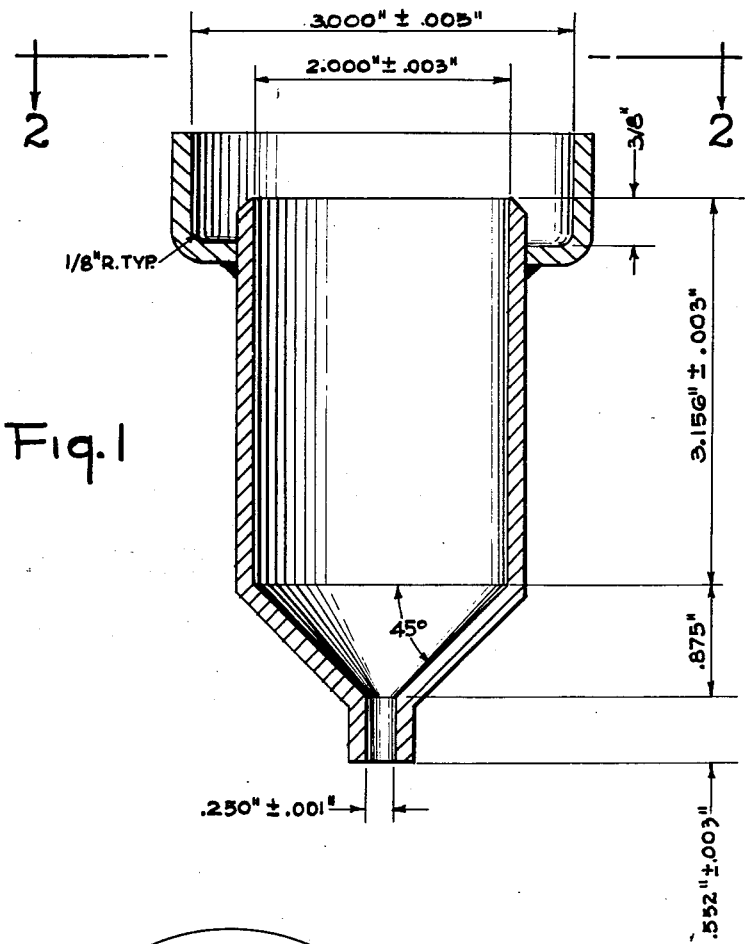
FIGURE 1 is a sectional elevational view of a viscosity cup employed in the determinations set forth in this application.
Figure 2:
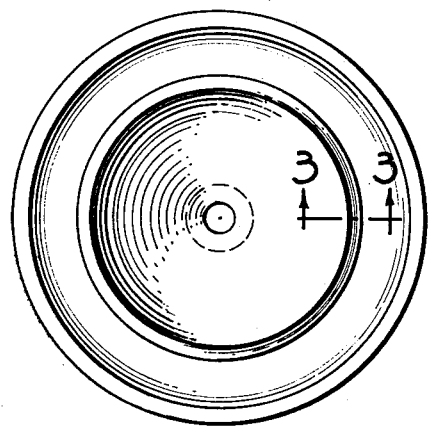
FIGURE 2 is a top plan view of the cup shown in FIGURE 1.
Figure 3:
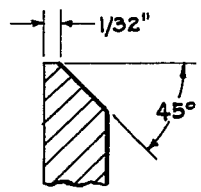
FIGURE 3 is a fragmentary view of a portion of the cup shown in FIGURE 1.

The viscosity of the dip coat should be adjusted, after the addition of water, to within the range of about 33–37 seconds when measured by flow through a standard cup, as set forth in FIGURES 1–3 of the drawing, and the pH of the composition should usually lie within the range of about 8.5, plus or minus 1. When the viscosity is low, it can be increased to a desired level by the addition of zircon flour. When the viscosity is too high, it can be lowered by the addition of colloidal silica and sodium fluoride in the ratio corresponding to that in which the respective materials are present in the original formula.

An improvement embodying the concept of this invention is to be found in the use of zircon flour as a filler in the dip coat composition by way of displacement of flint or silica flour which is ordinarily employed. It has been found that silica flour is subject to large inversions during temperature change between room temperature and 2000° F., whereby large contractions and expansions are caused to take place to introduce stresses within the mold formed, with resulting deterioration or destruction. With silica, as with other materials, if the inversion stages are traversed quickly, cracks are formed in the mold part through which cast molten metal can escape. This condition would be highly objectionable in an investment casting, let alone in a system where the mold part is adapted to be clamped directly to the furnace for metal pouring without investment or other protective covering.

The zircon used as the principal filler in the dip coat compositions embodying the features of this invention has been found to be relatively free of these inversion characteristics by comparison with silica flour or silica. The expansion and contraction characteristics of zircon are so low by comparison with other materials which have heretofore been employed, that the material can be heated up rapidly to elevated temperature for maturing the mold or for preheating the mold without endangering the mold by reason of extreme expansions and contractions. It is for this reason that the wax pattern with the stucco coats applied thereon can be directly introduced in a furnace maintained at a temperature as high as 1800–2200° F. to achieve a rapid heat-through of the shell for removal of the pattern and for properly maturing the ceramic materials, and it is for this reason that such elimination of the wax pattern and the maturing of the mold can be achieved within the space of 3 to 30 minutes. This is to be compared with a heating and baking cycle of more than 14 hours heretofore required for conventional and investment molds.

By way of further improvement in the characteristics of the mold fabricated by compositions embodying the features of this invention, the more rapid heat-through enhances the removal of the wax pattern and parts without endangering the mold. Slow heating of the molds, as necessitated by dip coat compositions and stuccos heretofore employed, permits the wax pattern and parts to become elevated in temperature before reaching a flowable state, with the result that expansions are caused to take place while the wax patterns and parts are still fully confined within the investment. Such expansions of the wax patterns and parts while still confined within the mold results in the development of tremendous forces which often lead to loss in dimension of the mold and sometimes to the destruction and deterioration thereof, which leads to imperfections in the mold that are incapable of detection short of the removal of the cast metal poured therein. The more rapid heat-through permitted by the use of this invention enables an entirely different operation. The outer portions of the wax patterns and parts can be reduced to a flowable state prior to elevation in temperature of the interior portions of the wax patterns and parts, with the result that the wax in the outer portions can be eliminated from the mold prior to the heat-through of the pattern. As a result, space is made available for subsequent expansions which take place upon heating up of the patterns and parts, thereby to minimize the development of destructive forces in the mold.

Instead of zircon, use can be made of finely divided flours of alumina, titania, stabilized zircon, fused quartz, thoria, chromite, sillimanite, mullite, magnesia, vycor glass and the like materials which have similar inversion characteristics, good heat shock properties, high fusion temperature, and relatively low expansion characteristics at elevated temperatures within the range from room temperature to 2200° F.

In the described system, it is preferred to make use of colloidal silica as the binder component which becomes set upon reaction with other materials in the mold, upon drying. In the dip coat compositions, it is desirable to make use of an amount of colloidal silica within the range of 2–15% by weight of the zircon or other filler, and preferably in an amount within the range of 3–7.5% by weight.

The sodium fluoride functions in the binder composition as an electrolyte component. It is believed to react in the composition as a deflocculent with the colloidal silica to bring about the gelation. Other materials can be employed in lieu of sodium fluoride, such for example as sodium hydroxide, magnesium sulfate and the like electrolytes, but materials such as sodium hydroxide offer less control because of their greater reactivity. Other sodium compounds soluble in the system may be employed as electrolytes. However, it would be desirable to minimize the sodium concentration to enable greater flexibility and control in the characteristics and gelation of the binder. Sodium fluoride is preferred as the electolytic agent and, when employed, it is desirable to make use thereof in an amount within the range of .1–.5% by weight of the flour component, and preferably in an amount within the range of .2–.3% by weight thereof.

The gum tragacanth lends materially to the stability of the dip coat composition and to its uniformity of coating when the cluster is dipped into the composition. Gum tragacanth is not essential to the composition but it functions as an aid for suspension thereby to stabilize the composition. When employed, it is desirable to make use of the gum in an amount within the range of .005–.05% by weight of the flour, and preferably in an amount within the range of .008–.010% by weight of the flour. Other water-soluble gums, such as gum elemi, kayara gum and the like water-soluble gums, or colloids such as alginates, polyvinyl alcohols and the like, may be employed in equivalent amounts.

The rubber latex component materially benefits the characteristic of the coating that is formed on the cluster. Representative of a commercial latex which can be employed is the latex identified as Dow Latex 560 (a water dispersion of a styrene-butadiene copolymer), which is marketed by the Dow Chemical Company of Midland, Michigan. A rubber latex should be employed in amounts ranging from 0.1–1.0% by weight of the flour, and preferably in an amount within the range of 0.2–0.4% by weight of the flour.

The wetting agent identified in the examples is a sodium salt of sulfated fatty alcohol. Other similar anionic wetting agents may be employed, such as dioctyl ester of sodium sulfacinamate, sulfated fatty acid esters, sodium oleyl methyl laurate, sodium salt of sulfated lorol and myristyl collamide, sodium salts of condensed naphtha sulfanate, alkyl aryl sodium sulfanate, sodium di(2-ethyl hexyl) phosphate and the like. In addition to the functions described, the described wetting agents operate also to improve the flour by suitable modification of surface tension.

The wetting agent may be employed in an amount ranging from .01–1.0% by weight of the flour, and preferably in an amount within the range of 0.3–0.4% by weight of the flour.

The octyl alcohol and similar higher molecular alcohols having a carbon length within the range of 5–16 may be employed in an amount within the range of 0.01–0.1% by weight of the flour. The alcohol component is not essential but it lends materially to the stability of the dip coat composition, to the drying characteristics thereof on the mold, and it functions further as an anti-foaming agent in the composition.

An important concept also resides in the dip coat composition embodying feldspar or the like eutectic material as a component of the filler to provide the characteristics which are defined in the aforementioned copending application. It is desirable to make use of an amount of feldspar capable of imparting the desired strength characteristics, but it is undesirable to make use of such concentration as will lead to excessive build-up in the mold which might lead to hot tears and the like. Feldspar in an amount less than 0.05 part per 1 part by weight of zircon or other filler in the dip coat composition has been found to be insufficient to provide the desired strength characteristics. When the amount of feldspar exceeds 0.25 part per 1 part by weight of zircon or other filler, the mold becomes so strong that it will lead to hot tears in operation and to excessive diffusion of the feldspar into the interior of the mold. In accordance with the practice of this invention, it is preferred to make use of the feldspar in an amount within the range of 0.08–0.15 part by weight of feldspar to 1 part by weight of the zircon or other filler in the dip coat composition, or about 8–15% by weight of the ceramic solids in the dip coat. Instead of feldspar, though not equivalent to feldspar, use can be made of other lower melting point ceramics, such as iron oxide, borax, borax glass, stannous chromite and the like low temperature, inorganic materials.

It will be understood that changes may be made in the details of formulation without departing from the spirit of the invention, especially as defined in the following claims.

We claim:

1. A dip coat composition for use in molding a shell about a heat disposable pattern in metal casting processes comprising an aqueous composition, the solids of which comprise a ceramic flour selected from the group consisting of alumina, titanium dioxide, zircon, fused quartz, thorium dioxide, chromite, sillimanite, mullite, magnesia and pure silica, colloidal silica present in an amount ranging from 2–15 percent by weight of the flour, an alkali metal fluoride present in an amount ranging from .1–.5 percent by weight of the flour, a water soluble gum present in an amount within the range of .005–.05 percent by weight of the flour, a synthetic rubber latex present in an amount within the range of 0.1–1.0 percent by weight of the flour, an anionic wetting agent present in an amount ranging from .01–1.0 percent by weight of the flour, and an aliphatic alcohol having a carbon length within the range of 5 to 16 present in an amount within the range of .01–1.0 percent by weight of the flour.

2. A dip coat composition as claimed in claim 1 in which the materials are incorporated into an aqueous medium having a pH within the range of 8.5±1.

3. A dip coat composition for use in molding a shell about a heat disposable pattern in metal casting processes comprising an aqueous composition, the solids of which comprise a ceramic flour selected from the group consisting of alumina, titanium dioxide, zircon, fused quartz, thorium dioxide, chromite, sillimanite, mullite, magnesia and pure silica, colloidal silica present in an amount ranging from 3–7.5 percent by weight of the flour, an alkali metal fluoride present in an amount ranging from .1–.5 percent by weight of the flour, a water soluble gum present in an amount within the range of .005–.05 percent by weight of the flour, a synthetic rubber latex present in an amount within the range of 0.2–0.4 percent by weight of the flour, an anionic wetting agent present in an amount ranging from .01–1.0 percent by weight of the flour, and an aliphatic alcohol having a carbon length within the range of 5 to 16 present in an amount within the range of .01–1.0 percent by weight of the flour.

4. A dip coat composition for use in molding a shell about a heat disposable pattern in metal casting processes comprising an aqueous composition, the solids of which comprise a ceramic flour selected from the group consisting of alumina, titanium dioxide, zircon, fused quartz, thorium dioxide, chromite, sillimanite, mullite, magnesia and pure silica, colloidal silica present in an amount ranging from 2–15 percent by weight of the flour, an alkali metal fluoride present in an amount ranging from .1–.5 percent by weight of the flour, a water soluble gum present in an amount within the range of .005–.05 percent by weight of the flour, a synthetic rubber latex present in an amount within the range of 0.1–1.0 percent by weight of the flour, and an anionic wetting agent present in an amount within the range of .01–1.0 percent by weight of the flour.

5. A dip coat composition for use in molding a shell about a heat disposable pattern in metal casting processes comprising an aqueous composition, the solids of which comprise a ceramic flour selected from the group consisting of alumina, titanium dioxide, zircon, fused quartz, thorium dioxide, chromite, sillimanite, mullite, magnesia and pure silica, colloidal silica present in an amount ranging from 3–7.5 percent by weight of the flour, an alkali metal fluoride present in an amount ranging from .2–.3 percent by weight of the flour, a water soluble gum present in an amount within the range of .008–.01 percent by weight of the flour, a synthetic rubber latex present in an amount within the range of .2–.4 percent by weight of the flour, and an alcohol having a carbon length within the range of 5–16 and present within the range of .05–.1 percent by weight of the flour.

6. A dip coat composition as claimed in claim 5 in which the alcohol comprises cetyl alcohol.

7. A dip coat composition for use in molding a shell about a heat disposable pattern in a metal casting process comprising an aqueous composition containing a ceramic flour in finely divided form selected from the group consisting of alumina, titanium dioxide, zircon, fused quartz, thorium dioxide, chromite, sillimanite, mullite, magnesia and pure silica, a colloidal silica present in an amount within the range of 2–15 percent by weight of the flour, an alkali metal fluoride present in an amount within the range of .1–.5 percent by weight of the flour, a water soluble gum present in an amount within the range of .005–.05 percent by weight of the flour, and a synthetic rubber latex present in an amount within the range of 0.1–1.0 percent by weight of the flour.

8. A dip coat composition as claimed in claim 7 in which the water soluble gum is gum tragacanth.

9. A dip coat composition as claimed in claim 7 in which the alkali metal fluoride is a sodium fluoride.

10. A dip coat composition as claimed in claim 7 in which the ceramic flour is zircon.

11. A dip coat composition as claimed in claim 7 in which the ceramic flour is a mixture of zircon and feldspar in which the materials are present in the ratio of 1 part by weight of zircon to .08–.15 part by weight of feldspar.

12. A dip coat composition as claimed in claim 7 in which the ceramic flour comprises the combination of zircon and feldspar in which the feldspar makes up 8–15 percent by weight of the total flour.

13. A dip coat composition as claimed in claim 7 in which the ceramic flour includes a low maturing ceramic material selected from the group consisting of feldspar, iron oxide, borax and stannous chromite, present in an amount to make up 8–15 percent by weight of the flour.

14. A dip coat composition as claimed in claim 7 in which the pH of the composition is within the range of 8.5±1.

References Cited in the file of this patent

UNITED STATES PATENTS

| 2,311,233 | Jaenicke et al. | Feb. 16, 1943 |

FOREIGN PATENTS

| 729,057 | Great Britain | May 4, 1955 |
| 520,794 | Canada | Jan. 17, 1956 |